(12) United States Patent
McCowen

(10) Patent No.: US 7,478,712 B2
(45) Date of Patent: Jan. 20, 2009

(54) ENERGY COLLECTION

(76) Inventor: Clint McCowen, 1902 Rue La Fontaine, Navarre, FL (US) 32566

( * ) Notice: Subject to any disclaimer, the term of this patent is extended or adjusted under 35 U.S.C. 154(b) by 0 days.

(21) Appl. No.: 11/839,112

(22) Filed: Aug. 15, 2007

(65) Prior Publication Data

US 2007/0273206 A1  Nov. 29, 2007

Related U.S. Application Data

(63) Continuation-in-part of application No. 11/358,264, filed on Feb. 21, 2006.

(51) Int. Cl.
*H02N 1/00* (2006.01)

(52) U.S. Cl. ............... 191/45 R; 307/149; 361/225; 361/117; 174/2; 320/101; 322/2 A; 191/1 R

(58) Field of Classification Search .......... 361/220, 361/117, 212, 233, 221, 222, 225; 322/2 A, 322/2 R; 307/149; 174/2, 3; 320/101; 191/2, 191/1 R, 45 R See application file for complete search history.

(56) References Cited

U.S. PATENT DOCUMENTS

| | | | | |
|---|---|---|---|---|
| 674,427 | A | * | 5/1901 | Palencsar ............... 307/149 |
| 911,260 | A | * | 2/1909 | Pennock ................ 307/149 |
| 1,014,719 | A | * | 1/1912 | Pennock ................ 307/149 |
| 4,104,696 | A | | 8/1978 | Cochran, Jr. |
| 5,047,892 | A | | 9/1991 | Sakata et al. |
| 6,735,830 | B1 | | 5/2004 | Merciel |
| 6,974,110 | B2 | | 12/2005 | Grandics |
| 2003/0107869 | A1 | | 6/2003 | Pan et al. |
| 2004/0160711 | A1 | | 8/2004 | Stumberger |
| 2004/0212945 | A1 | | 10/2004 | Sprenger et al. |

* cited by examiner

*Primary Examiner*—Mark T Le
(74) *Attorney, Agent, or Firm*—Thomas, Kayden, Horstemeyer & Risley, LLP

(57) ABSTRACT

An energy collection system may collect and use the energy generated by an electric field. Collection fibers are suspended from a support wire system supported by poles. The support wire system is electrically connected to a load by a connecting wire. The collection fibers may be made of any conducting material, but carbon, graphite, carbon/carbon, or a mixture thereof are preferred. Diodes may be used to restrict the backflow or loss of energy.

18 Claims, 15 Drawing Sheets

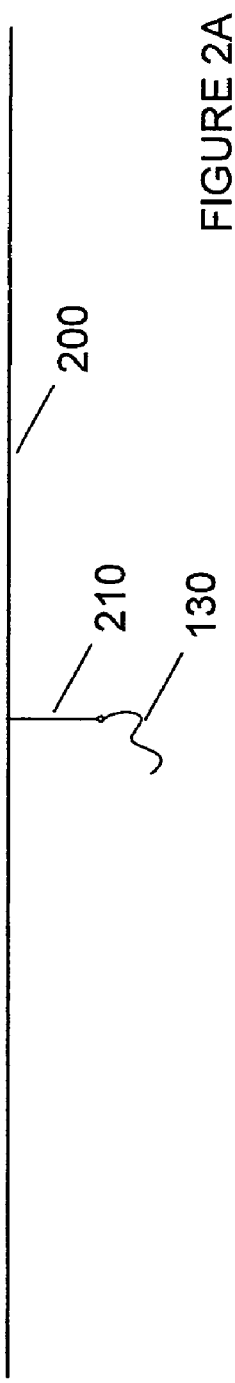
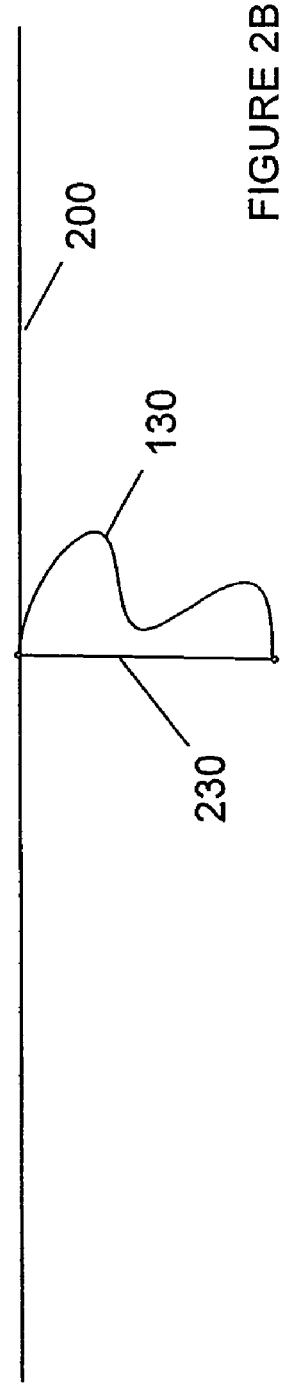

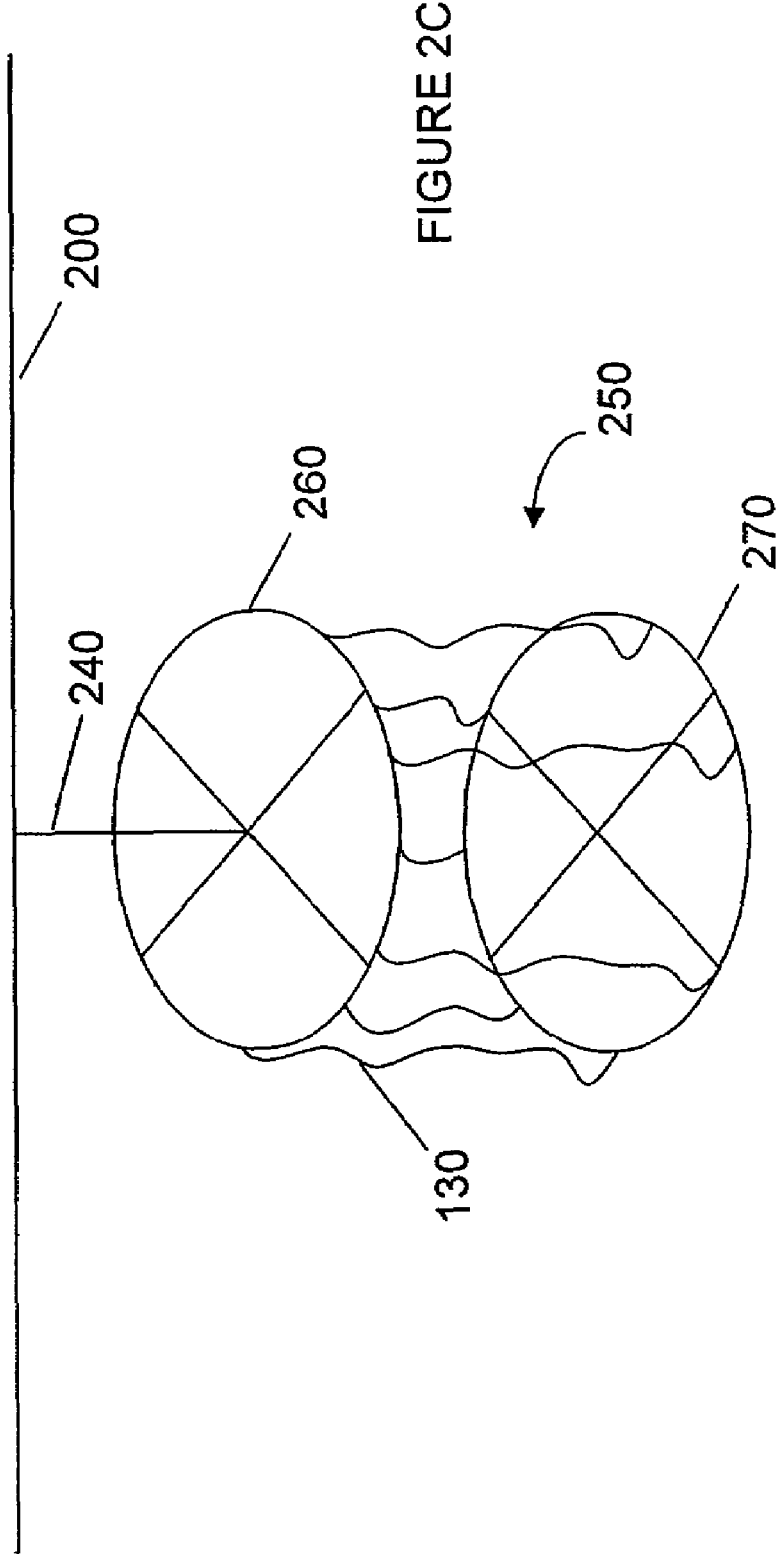

ENERGY COLLECTION

CROSS REFERENCE TO RELATED APPLICATION

This application is a continuation-in-part application of U.S. patent application Ser. No. 11/358,264, filed on Feb. 21, 2006, which is incorporated by reference herein.

TECHNICAL FIELD

The present disclosure is generally related to energy and, more particularly, is related to systems and methods for collecting energy.

BACKGROUND

The concept of fair weather electricity deals with the electric field and the electric current in the atmosphere propagated by the conductivity of the air or other gases. On Earth, clear, calm air carries an electrical current, which is the return path for thousands of lightening storms simultaneously occurring at any given moment around the Earth. For simplicity, this energy may be referred to as static electricity or static energy. FIG. 1 illustrates a weather circuit for returning the current from lightning, for example, back to ground 10. Weather currents 20, 30 return the cloud to ground current 40.

In a lightening storm, an electrical charge is built up, and electrons arc across a gas, ionizing it and producing the lightening flash. As one of ordinary skill in the art understands, the complete circuit requires a return path for the lightening flash. The atmosphere is the return path for the circuit. The electric field due to the atmospheric return path is relatively weak at any given point because the energy of thousands of electrical storms across the planet are diffused over the atmosphere of the entire Earth during both fair and stormy weather. Other contributing factors to electric current being present in the Earth's atmosphere or above the surface or in the atmosphere of other planets may include cosmic rays penetrating and interacting with the planet's surface and/or atmosphere, and also the creation and migration of electrically charged ions, as well as other effects yet to be fully studied.

Some of the ionization near the surface of a planet or in the lower atmosphere is caused by airborne radioactive substances. In most places on Earth, ions are formed at a rate of 5-10 pairs per cubic centimeter per second at sea level. With increasing altitude, cosmic radiation causes the ion production rate to increase. In areas with high radon exhalation from the soil (or building materials), the rate may be much higher.

Alpha-active materials are also responsible for atmospheric ionization. Each alpha particle (for instance, from a decaying radon atom) will, over its range of some centimeters, create approximately 150,000-200,000 ion pairs.

While there is a large amount of usable energy available in the atmosphere of Earth, as well as above the surface or in the atmosphere of other bodies in space, a method or apparatus for efficiently collecting that energy has not been forthcoming. Therefore, a heretofore unaddressed need exists in the industry to address the aforementioned deficiencies and inadequacies.

SUMMARY

Embodiments of the present disclosure provide systems and methods for collecting energy. Briefly described in architecture, one embodiment of the system, among others, can be implemented by a support structure wire elevated above a ground level, at least one collection fiber electrically connected to the support structure wire; a load electrically connected to the support structure wire; and a diode electrically connected between the load and at least one collection fiber.

Embodiments of the present disclosure can also be viewed as providing methods for collecting energy. In this regard, one embodiment of such a method, among others, can be broadly summarized by the following steps: suspending at least one collection fiber from a support structure wire elevated above ground level, the fiber electrically connected to the support structure wire; providing a load with an electrical connection to the support structure wire to draw current; and providing a diode electrically connected between the collection fiber and the load.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 2A is a side view of an energy collection fiber suspended from a support wire.

FIG. 2B is a side view of an example embodiment of an energy collection fiber suspended from a support wire and with an additional support member.

FIG. 2C is a perspective view of a support structure for multiple energy collection fibers.

DETAILED DESCRIPTION

Methods for collecting ambient energy have been known since the early 1900's. However, due to low efficiency, those methods did not become commercially feasible. One of the primary advantages of the present disclosure over past arts is the efficiency achievable by utilizing the collection fibers disclosed herein to collect or harvest said ambient energy. Another primary advantage over past arts is the dual-polarity circuit (FIG. 10) which makes use of both positive and negative ambient energy collected by the collection fibers to convert said energy into a steady positive electrical output.

Electric charges on conductors may reside entirely on the external surface of the conductors, and tend to concentrate more around sharp points and edges than on flat surfaces. Therefore, an electric field received by a sharp conductive point may be much stronger than a field received by the same charge residing on a large smooth conductive shell. An example embodiment of this disclosure takes advantage of this property, among others, to collect and use the energy generated by an electric field in the atmosphere or above the surface of a planet or heavenly body. "Energy" is not limited herein to energy generated by an electric field in the atmosphere. Energy as used herein may include any event, particle, or wave, including, but not limited to photons, protons, neutrons, electrons, neutrinos, leptons, muons, antimuons, mesons, baryons, positrons, bosons, gluons, gravitons, fermions, hadrons, ionic energy, gamma rays, cosmic rays, solar wind, quarks, energy generated by the triboelectric effect, convection lightning, and many other forms of energy known to one of ordinary skill in the art. These forms of energy, as well as others, may be present not only on Earth, but also on the moon of the Earth, on Mars, on Venus, and on other heavenly bodies and even in the relative vacuum of deep space.

Figure 1:
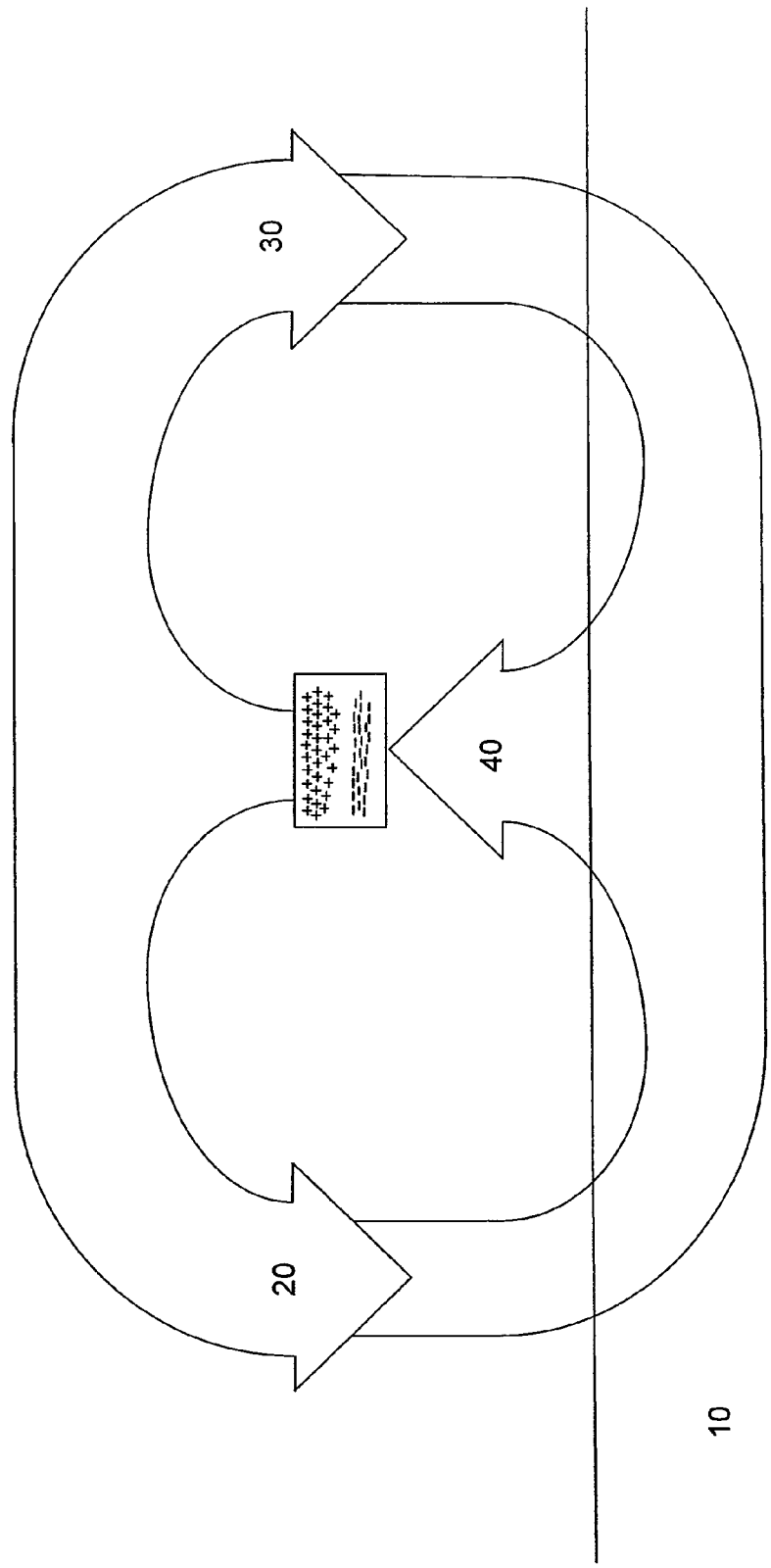
FIG. 1 is a circuit diagram of a weather energy circuit.
Figure 2:
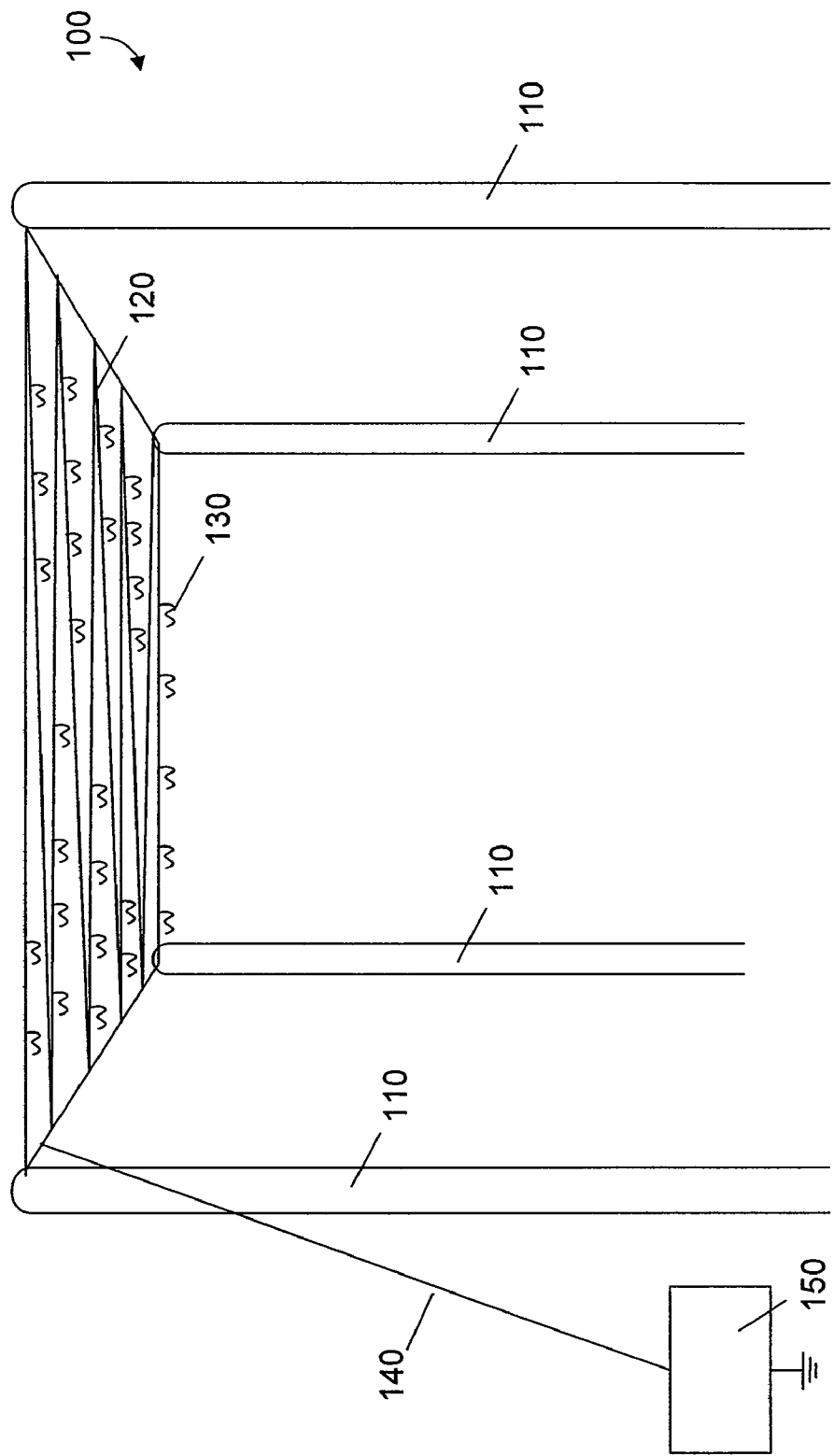
FIG. 2 is a perspective view of an example embodiment of many energy collectors elevated above ground by a structure.

Referring to collection system 100 presented in FIG. 2, at least one collection device 130 may be suspended from a support wire system 120 supported by poles 110. Collection device 130 may comprise a diode or a collection fiber individually, or the combination of a diode and a collection fiber. Support wire system 120 may be electrically connected to load 150 by connecting wire 140. Supporting wire system 120 may be any shape or pattern. Also, conducting wire 140 may be one wire or multiple wires. The collection device 130 in the form of a fiber may comprise any conducting or non-conducting material, including carbon, graphite, Teflon, and metal. An example embodiment utilizes carbon fibers, graphite fibers, carbon/carbon fibers, or a mixture thereof for energy collection. Support wire system 120 and connecting wire 140 can be made of any conducting material, including, but not limited to, aluminum, steel, copper, and super-conductive material. Teflon may be added to said conductor as well, such as non-limiting examples of a Teflon impregnated wire, a wire with a Teflon coating, or Teflon strips hanging from a wire. Conducting wire 120, 140, and 200 may be bare wire, or coated with insulation as a non-limiting example. Wires 120 and 140 are a means of transporting the energy collected by collection device 130.

An example embodiment of the collection fibers as collection device 130 includes graphite, carbon fibers, carbon/carbon fibers, or a mixture thereof. Graphite, carbon fibers, and carbon/carbon fibers, at a microscopic level, can have hundreds of thousands of points. Atmospheric electricity, energetic particles, or waves may be attracted to these points. If atmospheric electricity can follow two paths where one is a flat surface and the other is a pointy, conductive surface, the electrical charge will be attracted to the pointy, conductive surface. Generally, the more points that are present, the higher energy that can be gathered. Therefore, carbon, graphite fibers, carbon/carbon fibers, or a mixture thereof are examples that demonstrate example collection ability.

In at least one example embodiment, the height of support wire 120 may be an important factor. The higher that collection device 130 is from ground, the larger the voltage potential between collection device 130 and electrical ground. The electric field may be more than 100-300 volts per meter under some conditions on Earth. When support wire 120 is suspended at a particular altitude, wire 120 will itself collect a very small charge from ambient voltage. When collection device 130 is connected to support wire 120, collection device 130 becomes energized and transfers the energy to support wire 120.

A diode, not shown in FIG. 2, may be connected in several positions in collection system 100. A diode is a component that restricts the direction of movement of charge carriers. It allows an electric current to flow in one direction, but essentially blocks it in the opposite direction. A diode can be thought of as the electrical version of a check valve. The diode may be used to prevent the collected energy from discharging into the atmosphere through the collection fiber embodiment of collection device 130. An example embodiment of the collection device comprises the diode with no collection fiber. Another embodiment, however, includes a diode at the connection point of a collection fiber to support system 120 such that the diode is elevated above ground. Multiple diodes may be used between collection device 130 and load 150. Additionally, in an embodiment with multiple fibers, the diodes restrict energy that may be collected through one fiber from escaping through another fiber.

Collection device 130 may be connected and arranged in relation to support wire system 120 by many means. Some non-limiting examples are provided in FIGS. 2A-2G using a collection fiber embodiment. FIG. 2A presents support wire 200 with connecting member 210 for collection device 130. Connection member 210 may be any conducting material allowing for the flow of electricity from connection device 130 to support wire 200. Then, as shown in FIG. 2, the support wire 200 of support system 120 may be electrically connected through conducting wire 140 to load 150. A plurality of diodes may be placed at any position on the support structure wire. One embodiment places a diode at an elevated position at the connection point between a collection fiber embodiment of collection device 130 and connection member 210. In an alternative embodiment, a diode is not placed between collection device 130 and connection member 210.

Likewise, FIG. 2B shows collection fiber 130 electrically connected to support wire 200 and also connected to support member 230. Support member 230 may be connected to collection fiber 130 on either side. Support member 230 holds the fiber steady on both ends instead of letting it move freely. Support member 230 may be conducting or non-conducting.

A plurality of diodes may be placed at any position on the support structure wire. One embodiment places a diode at elevated position at the connection point between collection fiber 130 and support wire 200 or between fiber 130, support member 230, and support wire 200. In an alternative embodiment, a diode is not placed between collection fiber 130 and support wire 200 or between fiber 130, support member 230, and support wire 200.

FIG. 2C presents multiple collection fibers in a squirrel cage arrangement with top and bottom support members. Support structure 250 may be connected to support structure wire 200 by support member 240. Structure 250 has a top 260 and a bottom 270 and each of the multiple collection fibers 130 are connected on one end to top 260 and on the other end to bottom 270. A plurality of diodes may be placed at any position on support structure 250. One embodiment places a diode at an elevated position at the connection point between collection fiber 130 and support structure wire 200. In an alternative embodiment, a diode is not placed at an elevated position at the connection point between collection fiber 130 and support structure wire 200.

Figure 2D:
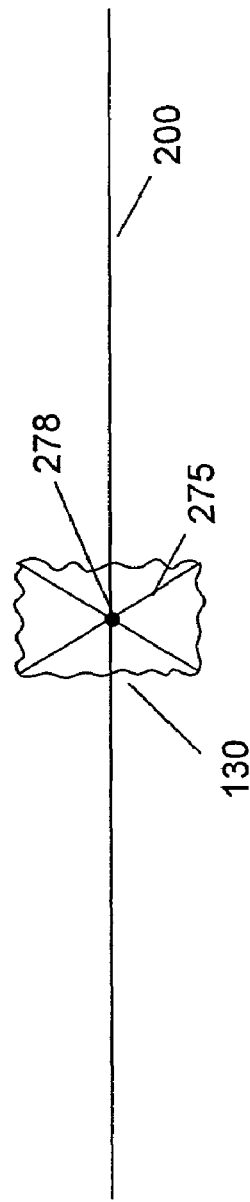
FIG. 2D is a side view of an example embodiment of a support structure for multiple energy collection fibers.

FIG. 2D presents another example embodiment of a support structure with support members 275 in an x-shape connected to support structure wire 200 at intersection 278 with collection fibers 130 connected between ends of support members 275. A plurality of diodes may be placed at any position on the support structure. One embodiment places a diode at an elevated position at the connection point between collection fiber 130 and support wire 200. In an alternative embodiment, a diode is not placed at an elevated position at the connection point between collection fiber 130 and support wire 200.

Figure 2E:
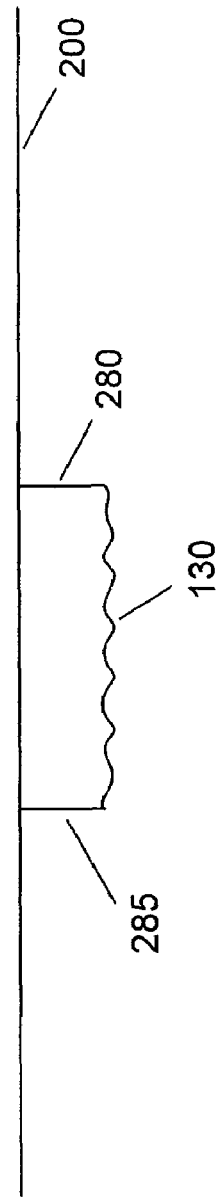
FIG. 2E is a side view of a support structure for an energy collection fiber.

FIG. 2E provides another example embodiment for supporting collection fiber 130. Collection fiber 130 may be connected on one side to support member 285, which may be connected to support structure wire 200 in a first location and on the other side to support member 280, which may be connected to support structure wire 200 in a second location on support structure wire 200. The first and second locations may be the same location, or they may be different locations, even on different support wires. A plurality of diodes may be placed at any position on the support structure. One embodiment places one or more diodes at elevated positions at the connection point(s) between collection fiber 130 and support wire 200. In an alternative embodiment, one or more diodes are not placed at elevated positions at the connection point(s) between collection fiber 130 and support wire 200.

Figure 2F:
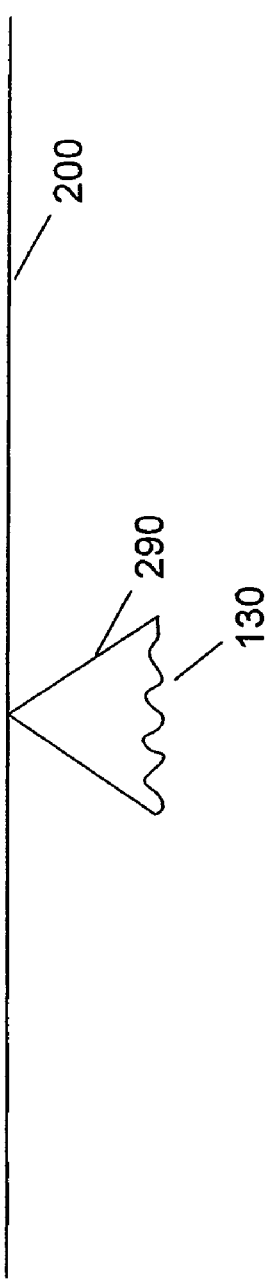
FIG. 2F is a side view of an example embodiment of a support structure for an energy collection fiber.

FIG. 2F presents another example embodiment of a support for a collection fiber. Two support members 290 may support either side of a collection fiber and are connected to support wire 200 in a single point. A plurality of diodes may be placed at any position on the support structure. One embodiment places a diode at an elevated position at the connection point between collection fiber 130 and support wire 200. In an alternative embodiment, a diode is not placed at an elevated position at the connection point between collection fiber 130 and support wire 200.

Figure 2G:
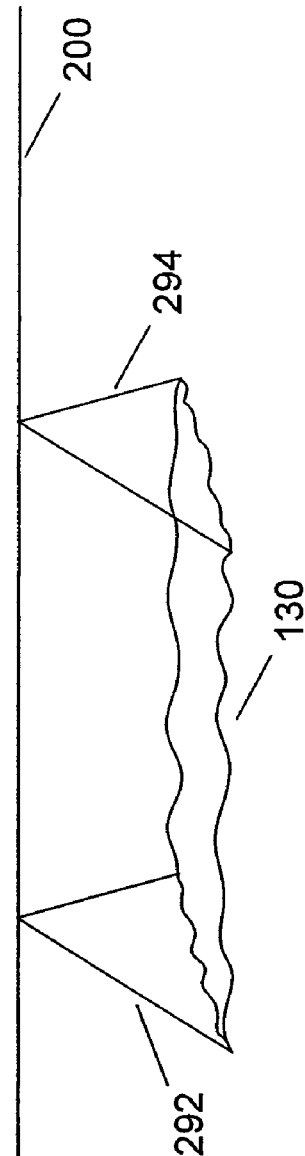
FIG. 2G is a side view of a support structure for multiple energy collection fibers.

FIG. 2G provides two supports as provided in FIG. 2F such that at least two support members 292, 294 may be connected to support structure wire 200 in multiple locations and collection fibers 130 may be connected between each end of the support structures. Collection fibers 130 may be connected between each end of a single support structure and/or between multiple support structures. A plurality of diodes may be placed at any position on the support structure. One embodiment places one or more diodes at elevated positions at the connection point(s) between collection fiber 130 and support structure wire 200. In an alternative embodiment, one or more diodes are not placed at elevated positions at the connection point(s) between collection fiber 130 and support wire 200.

Figure 3:
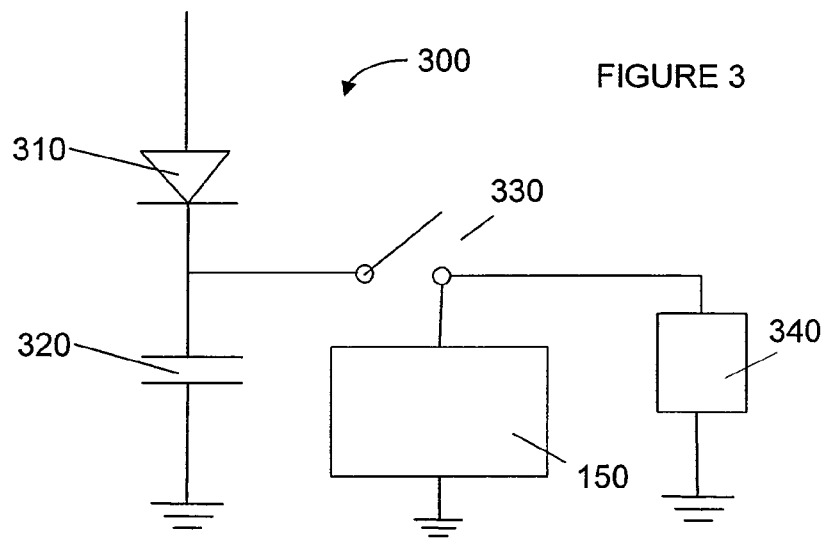
FIG. 3 is a circuit diagram of an example embodiment of a circuit for the collection of energy.

FIG. 3 provides a schematic diagram of storing circuit 300 for storing energy collected by one or more collection devices (130 from FIG. 2). Load 150 induces current flow. Diode 310 may be electrically connected in series between one or more collection devices (130 from FIG. 2) and load 150. A plurality of diodes may be placed at any position in the circuit. Switch 330 may be electrically connected between load 150 and at least one collection device (130 from FIG. 2) to connect and disconnect the load. Capacitor 320 may be connected in parallel to the switch 330 and load 150 to store energy when switch 330 is open for delivery to load 150 when switch 330 is closed. Rectifier 340 may be electrically connected in parallel to load 150, between the receiving end of switch 330 and ground. Rectifier 340 may be a full-wave or a half-wave rectifier. Rectifier 340 may include a diode electrically connected in parallel to load 150, between the receiving end of switch 330 and ground. The direction of the diode of rectifier 340 is optional.

Figure 4:
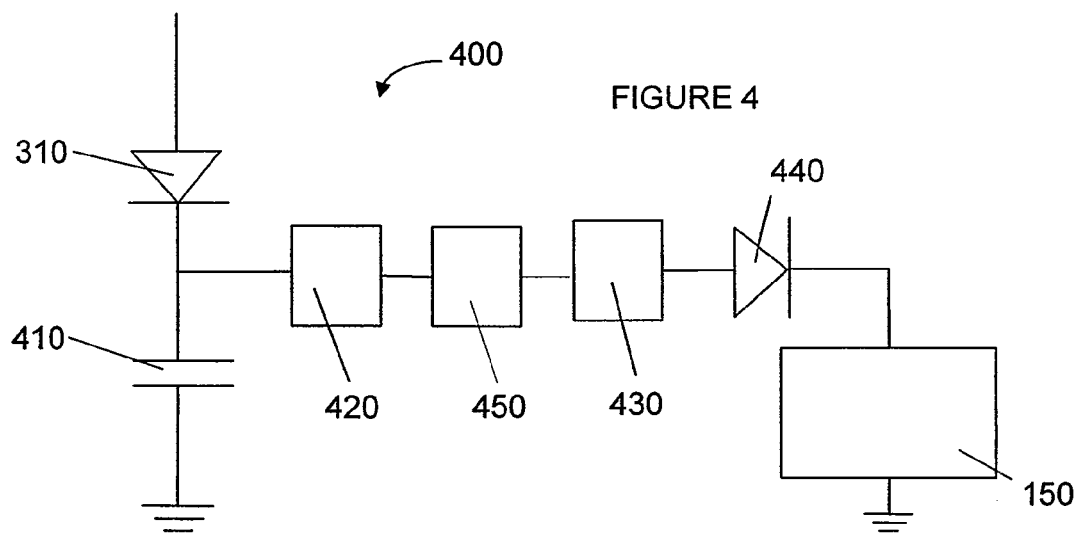
FIG. 4 is a circuit diagram of an example embodiment of a circuit for the collection of energy.

In an example embodiment provided in FIG. 4, storage circuit 400 stores energy from one or more collection devices (130 from FIG. 2) by charging capacitor 410. If charging capacitor 410 is not used, then the connection to ground shown at capacitor 410 is eliminated. A plurality of diodes may be placed at any position in the circuit. Diode 310 may be electrically connected in series between one or more collection devices (130 from FIG. 2) and load 150. Diode 440 may be placed in series with load 150. The voltage from capacitor 410 can be used to charge spark gap 420 when it reaches sufficient voltage. Spark gap 420 may comprise one or more spark gaps in parallel or in series. Non-limiting examples of spark gap 420 include mercury-reed switches, mercury-wetted reed switches, open-gap spark gaps, and electronic switches. When spark gap 420 arcs, energy will arc from one end of the spark gap 420 to the receiving end of the spark gap 420. The output of spark gap 420 may be electrically connected in series to rectifier 450. Rectifier 450 may be a full-wave or a half-wave rectifier. Rectifier 450 may include a diode electrically connected in parallel to transformer 430 and load 150, between the receiving end of spark gap 420 and ground. The direction of the diode of rectifier 450 is optional. The output of rectifier 450 is connected to transformer 430 to drive load 150.

Figure 5:
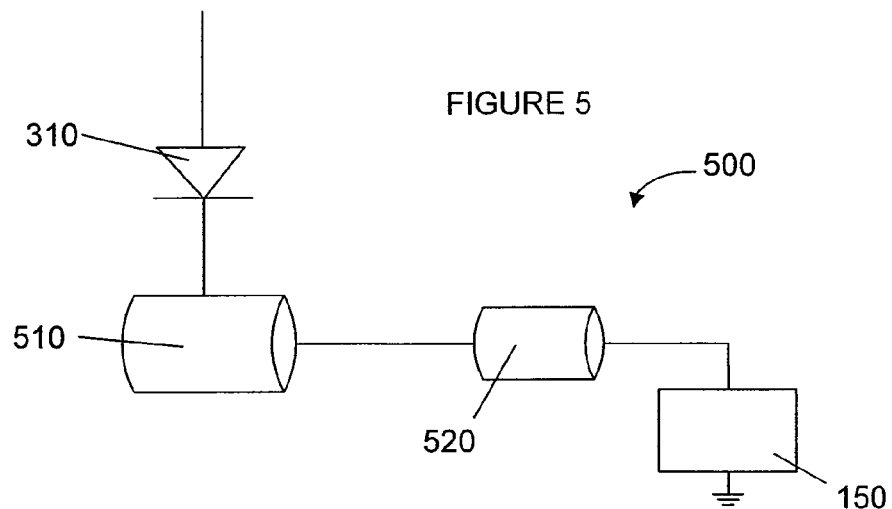
FIG. 5 is a circuit diagram of an example embodiment of an energy collection circuit for powering a generator and motor.

FIG. 5 presents motor driver circuit 500. One or more collection devices (130 from FIG. 2) are electrically connected to static electricity motor 510, which powers generator 520 to drive load 150. A plurality of diodes may be placed at any position in the circuit. Motor 510 may also be directly connected to load 150 to drive it directly.

Figure 6:
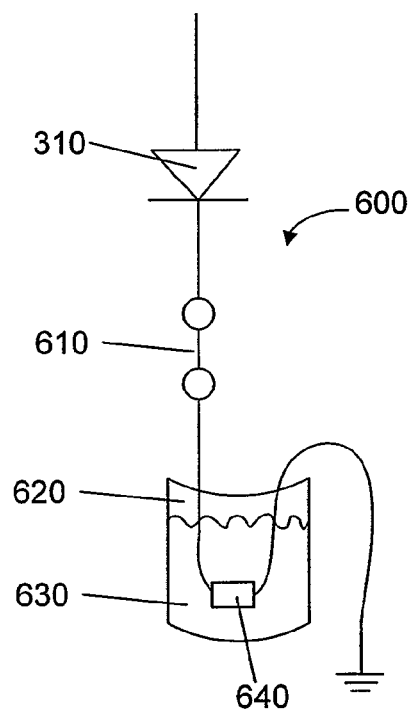
FIG. 6 is a circuit diagram of an example embodiment of a circuit for collecting energy and using it for the production of hydrogen and oxygen.

FIG. 6 demonstrates a circuit 600 for producing hydrogen. A plurality of diodes may be placed at any position in the circuit. One or more collection devices (130 from FIG. 2) are electrically connected to primary spark gap 610, which may be connected to secondary spark gap 640. Non-limiting examples of spark gaps 610, 640 include mercury-reed switches, mercury-wetted reed switches, open-gap spark gaps, and electronic switches. Secondary spark gap 640 may be immersed in water 630 within container 620. When secondary spark gap 640 immersed in water 630 is energized, spark gap 640 may produce bubbles of hydrogen and oxygen, which may be collected to be used as fuel or as components for breathable air, among other uses.

Figure 7:
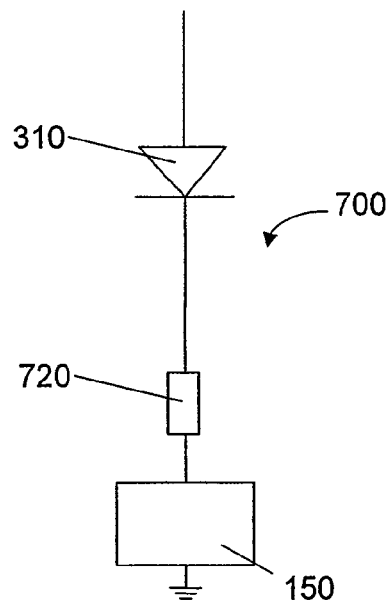
FIG. 7 is a circuit diagram of an example embodiment of a circuit for collecting energy, and using it for driving a fuel cell.

FIG. 7 presents circuit 700 for driving a fuel cell. A plurality of diodes may be placed at any position in the circuit.

Collection devices (130 from FIG. 2) provide energy to fuel cell 720 which drives load 150. Fuel cell 720 may produce hydrogen and oxygen.

Figure 8:
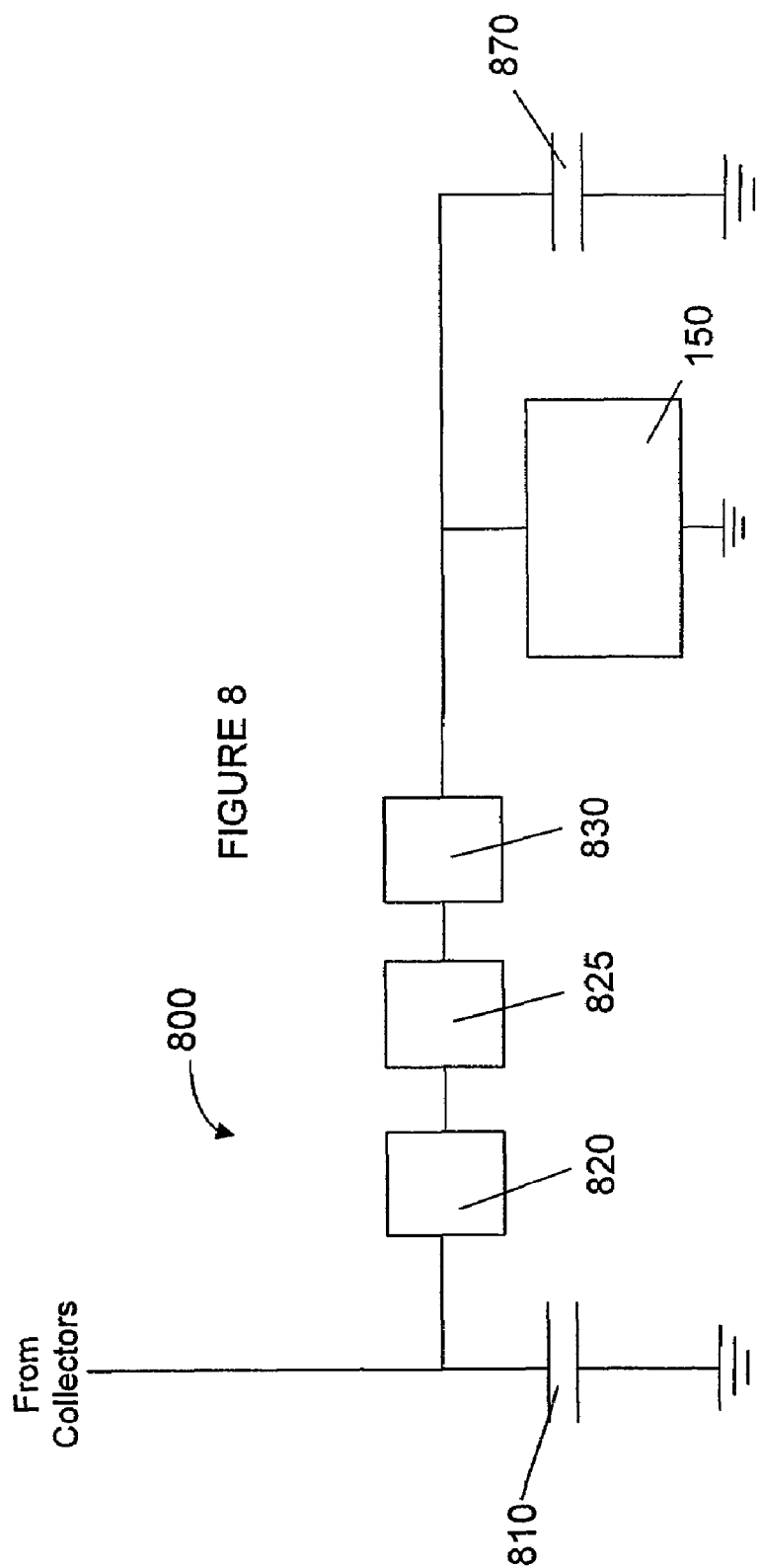
FIG. 8 is a circuit diagram of an example embodiment of a circuit for collecting energy.

FIG. 8 presents example circuit 800 for the collection of energy. Storage circuit 800 stores energy from one or more collection devices (130 from FIG. 2) by charging capacitor 810. If charging capacitor 810 is not used, then the connection to ground shown at capacitor 810 is eliminated. A plurality of diodes may be placed at any position in the circuit. The voltage from capacitor 810 can be used to charge spark gap 820 when it reaches sufficient voltage. Spark gap 820 may comprise one or more spark gaps in parallel or in series. Non-limiting examples of spark gap 820 include mercury-reed switches, mercury-wetted reed switches, open-gap spark gaps, and electronic switches. When spark gap 820 arcs, energy will arc from one end of spark gap 820 to the receiving end of spark gap 820. The output of spark gap 820 may be electrically connected in series to rectifier 825. Rectifier 825 may be a full-wave or a half-wave rectifier. Rectifier 825 may include a diode electrically connected in parallel to inductor 830 and load 150, between the receiving end of spark gap 820 and ground. The direction of the diode of rectifier 825 is optional. The output of rectifier 825 is connected to inductor 830. Inductor 830 may be a fixed value inductor or a variable inductor. Capacitor 870 may be placed in parallel with load 150.

Figure 9:
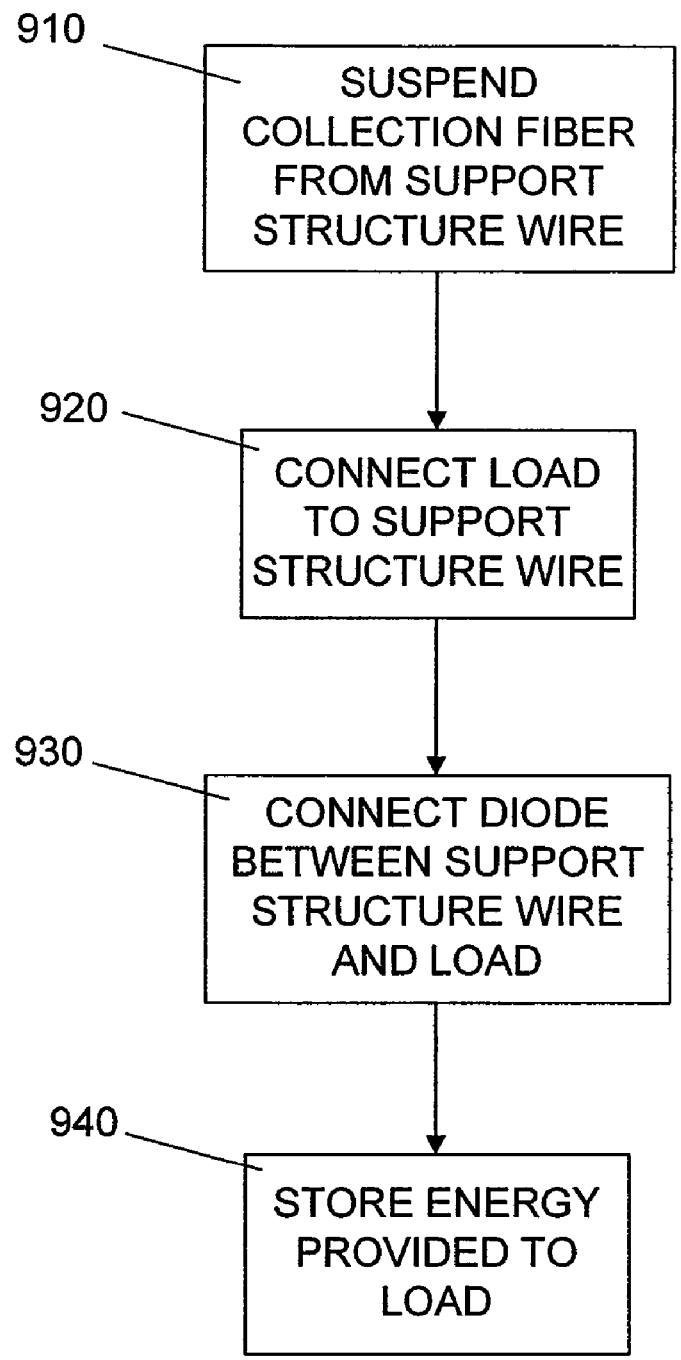
FIG. 9 is a flow diagram of an example embodiment of collecting energy with a collection fiber.

FIG. 9 presents a flow diagram of a method for collecting energy. In block 910, one or more collection devices may be suspended from a support structure wire. In block 920, a load may be electrically connected to the support structure wire to draw current. In block 930 a diode may be electrically connected between the support structure wire and the electrical connection to the load. In block 940, energy provided to the load may be stored or otherwise utilized.

Figure 10:
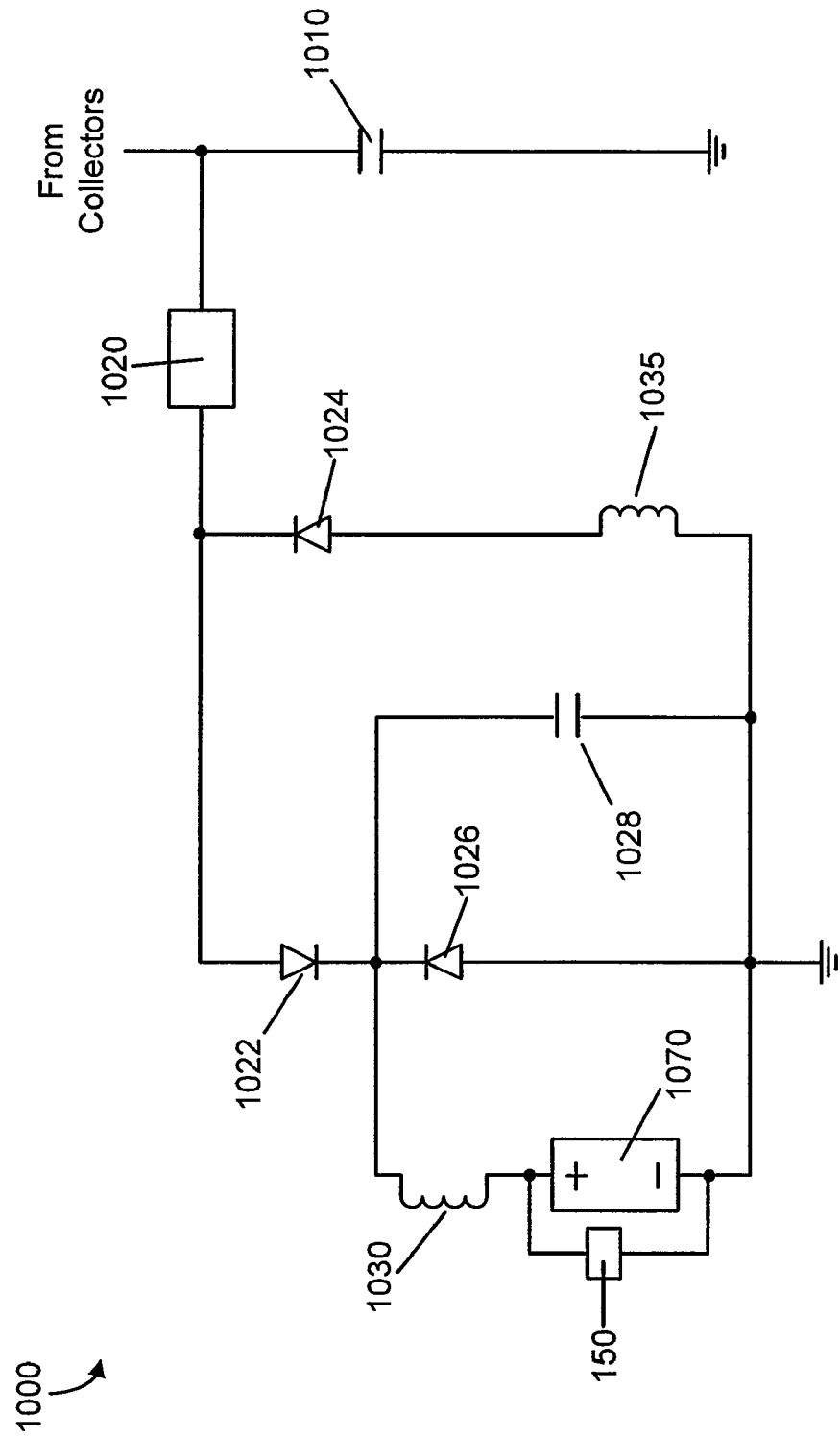
FIG. 10 is a circuit diagram of an example embodiment of a circuit for collecting energy from a dual polarity source.

FIG. 10 presents circuit 1000 as an example embodiment for the collection of energy from a dual polarity source. This may be used, for example, to collect atmospheric energy that reverses in polarity compared with the ground. Such polarity reversal has been discovered as occurring occasionally on Earth during, for example, thunderstorms and bad weather, but has also been observed during good weather. Such polarity reversal may occur on other planetary bodies, including Mars and Venus, as well. Energy polarity on other planets, in deep space, or on other heavenly bodies, may be predominantly negative or predominantly positive. Collector fibers (130 from FIG. 2) are capable of collecting positive energy and/or negative energy, and circuit 1000 is capable of processing positive and/or negative energy, providing an output which is always positive. Circuit 1000 may collect energy from one or more collection devices (130 from FIG. 2). Charging capacitor 1010 may be used to store a charge until the voltage at spark gap 1020 achieves the spark voltage. Capacitor 1010 is optional.

A plurality of diodes may be placed in a plurality of positions in circuit 1000. The voltage from capacitor 1010 may be used to charge spark gap 1020 to a sufficient voltage. Spark gap 1020 may comprise one or more spark gaps in parallel or in series. Non-limiting examples of spark gap 1020 include mercury-reed switches, mercury-wetted reed switches, open-gap spark gaps, and electronic switches. When spark gap 1020 arcs, energy will arc from an emitting end of spark gap 1020 to a receiving end of spark gap 1020. The output of spark gap 1020 is electrically connected to the anode of diode 1022 and the cathode of diode 1024. The cathode of diode 1022 is electrically connected to the cathode of diode 1026 and inductor 1030. Inductor 1030 may be a fixed value inductor or a variable inductor. The anode of diode 1026 is electrically connected to ground. Capacitor 1028 is electrically connected between ground and the junction of the cathodes of diode 1022 and diode 1026. Inductor 1035 is electrically connected between ground and the anode of diode 1024. Inductor 1035 may be a fixed value inductor or a variable inductor. Capacitor 1070, the anode of diode 1026, inductor 1035, and load 1050 are electrically connected to ground. Capacitor 1070 may be placed in parallel with load 150.

Figure 11:
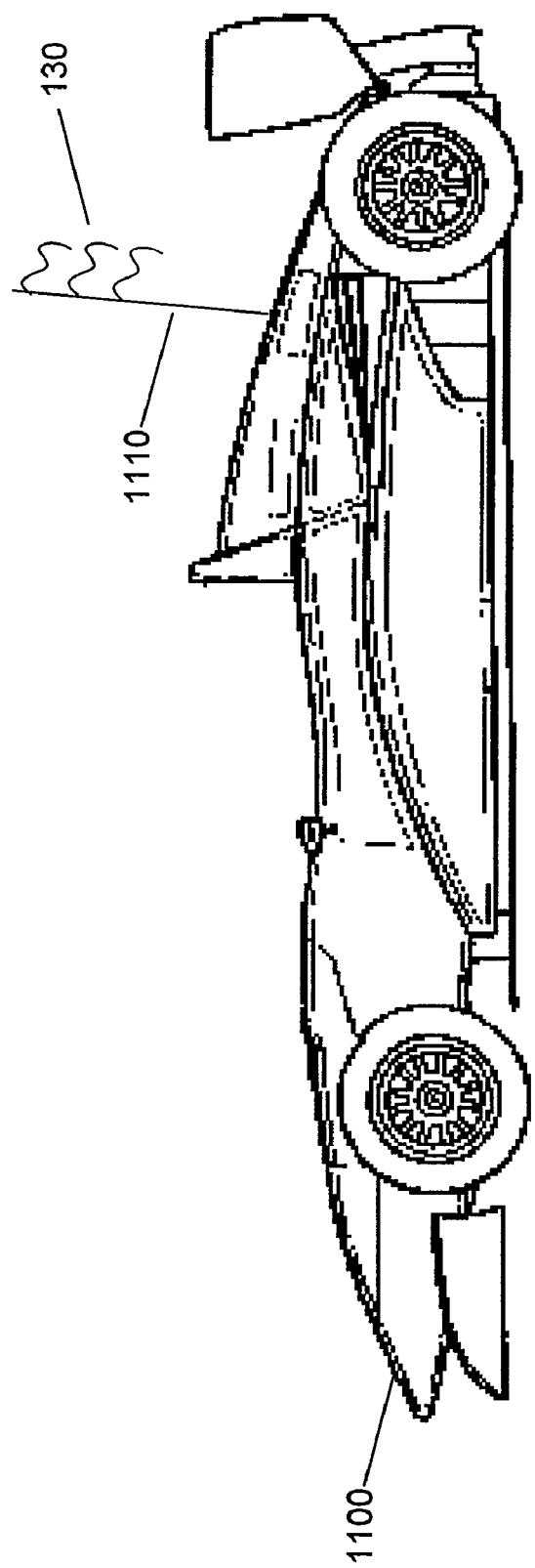
FIG. 11 is a system diagram of an example embodiment of an energy collection system connected to an automobile vehicle.
Figure 12:
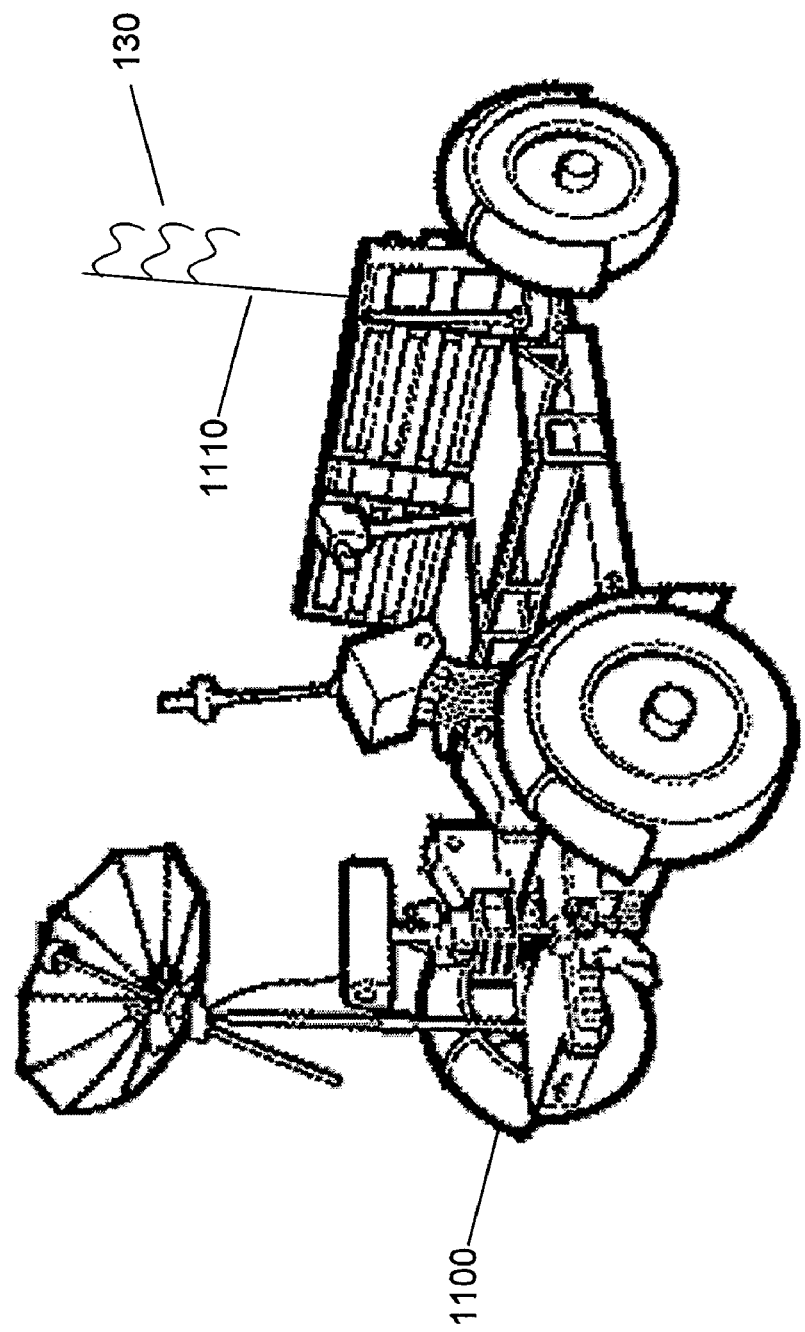
FIG. 12 is a system diagram of an example embodiment of an energy collection system connected to a lunar rover vehicle.

FIGS. 11 and 12 provide example embodiments of vehicle 1110, which utilizes electricity, the vehicle employing systems of energy collection provided herein. Vehicle 1100 in FIG. 11 is shown as an automobile vehicle, but could be any means of locomotion that utilizes electricity, including a car, a train, a motorcycle, a boat, an airplane, robotic rovers, space craft, etc. Vehicle 1100 in FIG. 12 is shown as a lunar rover vehicle. In FIGS. 11 and 12, support rod 1110 is electrically connected to an electrical system in vehicle 1100. Energy collectors 130 are electrically connected to support rod 1110 and may be used to supply energy to electrical circuits within the vehicle. A non-limiting use includes a top-off charge for a battery system, on-board hydrogen production, and/or assisting in the same. Energy collectors 130 may be used to augment the efficiency of the locomotion that utilizes electrical energy as well.

Figure 13:
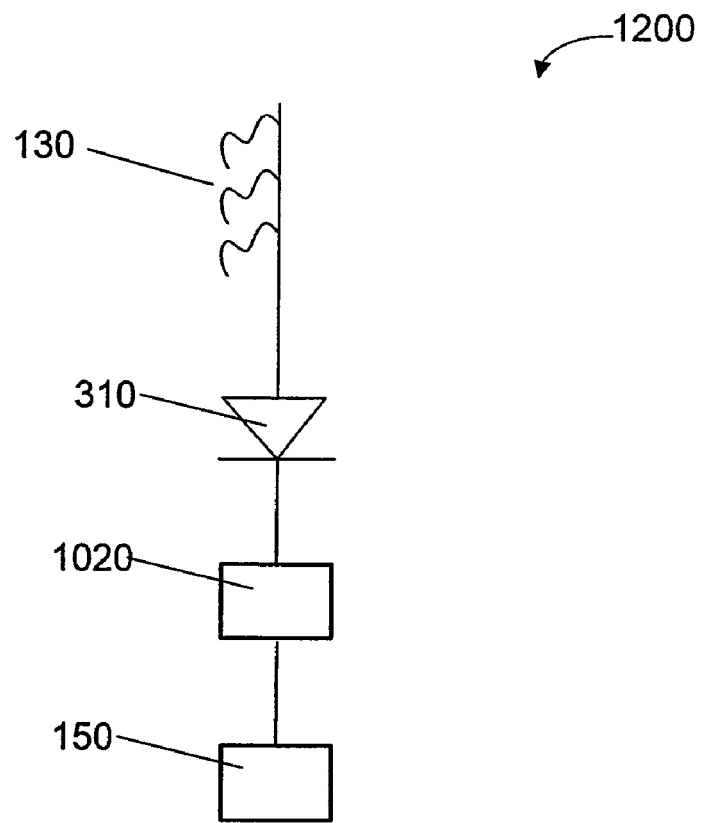
FIG. 13 is a system diagram of an example embodiment of an energy collection system comprising collection devices with a diode.

FIG. 13 provides an example embodiment of energy collection system 1200 in which diode 310 is used to isolate collection devices 130 from spark gap 1020 and load 150. Collection devices 130 may comprise graphite, carbon fibers, carbon/carbon fibers, or a mixture thereof.

Figure 14:
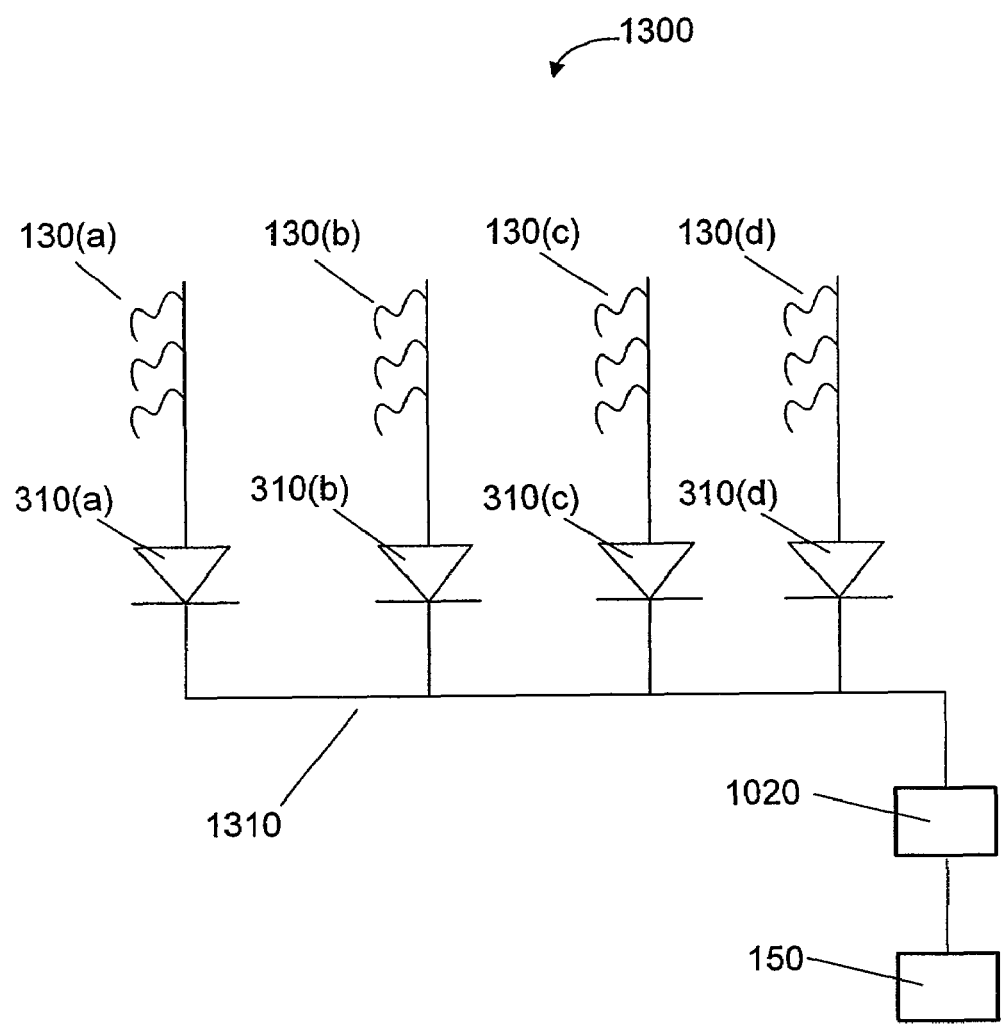
FIG. 14 is a system diagram of an example embodiment of an energy collection system comprising multiple legs of the system of FIG. 13.

FIG. 14 provides an example embodiment of energy collection system 1300 in which a plurality of energy collection systems, such as that provided in FIG. 13, are combined. Each leg consisting of collection devices 130 and diode 310 are connected in parallel with other legs, each leg electrically connected to trunk wire 1310. The legs could also be connected serially. Trunk wire 1310 is electrically connected to a collection circuit, which may comprise load 150 and spark gap 1020 in any configuration that has been previously discussed. Each leg may comprise one or more collection devices 130 and at least one diode electrically connected between the collection devices and the collection circuit. Although three collection devices 130 are shown on each leg, any number of collection devices may be used. Although four legs are shown, any number of legs may be used.

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

Therefore, at least the following is claimed:

1. A system of energy collection comprising: a plurality of support structure wires elevated above ground level; at least one collection device including at least one carbon or graphite fiber that collects electrical energy from the air and is electrically connected to the plurality of support structure wires; a load electrically connected to the plurality of support structure wires; and a dual polarity collection circuit electrically connected between the collection device and the load.

2. The system of claim 1, wherein the collection device comprises a diode.

3. The system of claim 1, wherein the collection device comprises:
   a diode electrically connected between the load and the fiber.

4. The system of claim 2, wherein the diode is elevated relative to the ground level.

5. The system of claim 1, wherein the fiber comprises graphite, carbon fibers, carbon/carbon fibers, or a mixture thereof.

6. The system of claim 1, further comprising a diode electrically connected between the at least one collection device and the plurality of support structure wires.

7. The system of claim 1, wherein the dual polarity collection circuit comprises a plurality of diodes, at least one inductor, and at least one capacitor.

8. The system of claim 7, wherein the capacitor is electrically connected in parallel with the load.

9. A vehicle employing a system of energy collection comprising: a means of locomotion; a support structure electrically connected to the vehicle; at least one collection device including at least one carbon or graphite fiber that collects electrical energy from the air and is electrically connected to the support structure; and a load electrically connected to the support structure.

10. The structure of claim 9, wherein the collection device comprises a diode.

11. The structure of claim 9, wherein the collection device comprises: a diode electrically connected between the load and the fiber.

12. The structure of claim 10, wherein the diode is elevated relative to the vehicle.

13. The structure of claim 9, wherein the fiber comprises graphite, carbon fibers, carbon/carbon fibers, or a mixture thereof.

14. The structure of claim 9, further comprising a diode electrically connected between the at least one collection device and the support structure.

15. A system of collecting energy comprising:
   a plurality of collection legs, each of the collection legs comprising:
   at least one collection device including at least one carbon or graphite fiber that collects electrical energy from the air; and
   a diode; and
   a load electrically connected to ground.

16. The system of claim 15, wherein the fiber comprises a surface having projections.

17. The system of claim 15, further comprising a trunk line electrically connected between the plurality of collection legs and the load.

18. The system of claim 17, further comprising a spark gap device electrically connected between the plurality of collection legs and the load.

* * * * *